No. 672,098. Patented Apr. 16, 1901.
C. L. FAHNESTOCK.
ADJUSTABLE AXLE FOR WHEELS.
(Application filed Jan. 12, 1901.)
(No Model.)
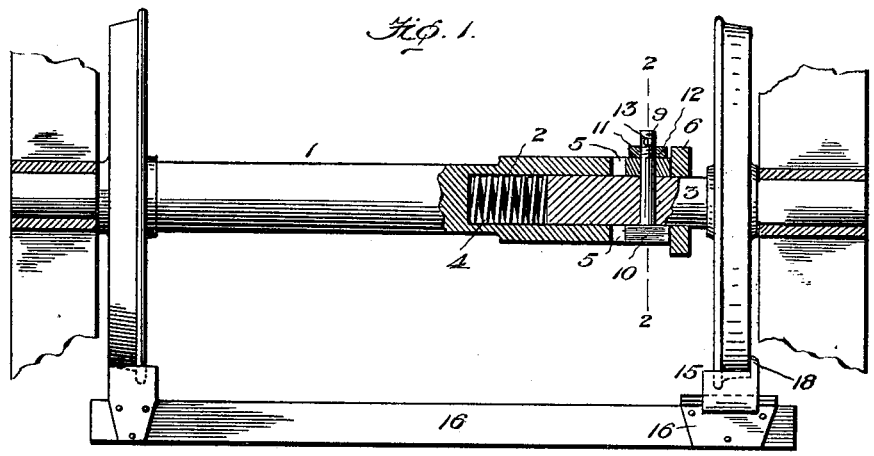
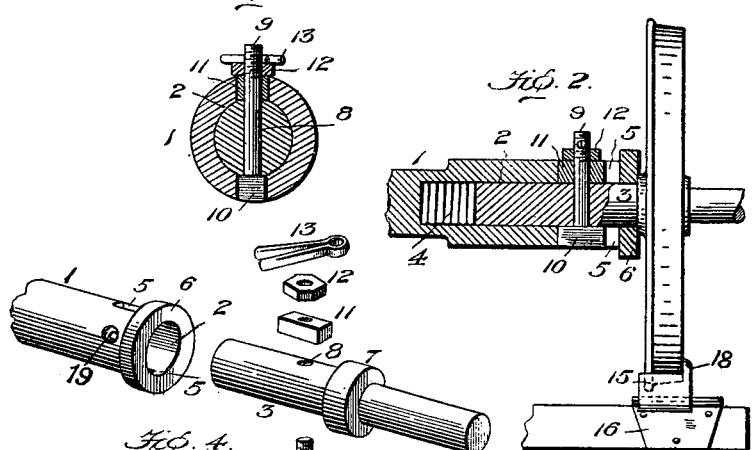
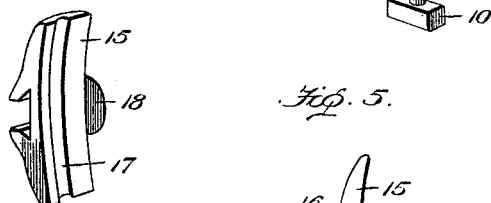
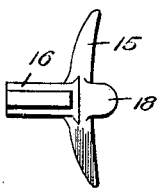
Witnesses
Inventor
Charles L. Fahnestock
by Johnson & Johnson
Attorneys

UNITED STATES PATENT OFFICE.

CHARLES L. FAHNESTOCK, OF WINCHESTER, VIRGINIA.

ADJUSTABLE AXLE FOR WHEELS.

SPECIFICATION forming part of Letters Patent No. 672,098, dated April 16, 1901.

Application filed January 12, 1901. Serial No. 42,974. (No model.)

*To all whom it may concern:*

Be it known that I, CHARLES L. FAHNESTOCK, a citizen of the United States, residing at Winchester, in the county of Frederick and State of Virginia, have invented certain new and useful Improvements in Adjustable Axles for Cars, of which the following is a specification.

For axles of street-cars I have produced a new construction whereby one of the wheels is adapted to adjust itself endwise with its axle part in running over curves and any irregularities in the gage of the rails, and thereby prevent the sudden lateral binding of the wheel-flanges against the rails, the jerking lateral motions of the car, and undue strain on the axles and wheels usually caused in running around curves. For this purpose an axle of two sections has been proposed, in which one of the sections is adapted for longitudinal movement within the other, with a spring interposed between the sections, so that each axle part, with its wheel, is free to turn independently of the other, or both axle parts are engaged so as to turn as a single axle.

My new construction provides a strong and durable connection for the separate axle-sections, whereby they are caused to turn together, while allowing one section, with its wheel, to have the desired endwise movement on the other axle-section in turning curves. With such self-adjusting movement of the wheel I have made provision whereby the brake-shoe is adapted to slide on its brake-bar inward to retain its connection with the changing position of the wheel.

The accompanying drawings illustrate my improvement, in which—

Figure 1 shows in longitudinal section a pair of wheels and their separate axle-sections as connected together and so much of the brake as shows one of its shoes adapted to slide with the slidable wheel. Fig. 2 shows such axle connections in the position in which the wheel in turning a curve has by the action of its flange on the rail been caused to adjust itself thereto by an inward sliding movement on the other axle part. Fig. 3 shows in transverse section the axle-sections and the connections by which they are caused to turn as a single axle. Fig. 4 shows the slidable axle-section, the socketed end of the non-slidable axle-section, and the parts whereby the axle-sections are fastened together. Fig. 5 is an end view of the brake-shoe bar and the shoe dovetailed thereon. Fig. 6 is the brake-shoe.

A long axle-section 1 has fixed thereon one of the wheels and the gear, which connects with driving mechanism of the car in the usual manner. The inner end of this axle-section has a deep bore 2, and the axle is enlarged in diameter to give it strength at this bore. A short axle-section 3 has fixed thereon the other wheel and is fitted within the bore of the long axle-section with a spring 4, interposed between the end of the socket and the end of the short shaft-section, constantly pressing the latter outward.

The bored axle end has longitudinal slots 5 5 diametrically in its walls, a shoulder 6 at the bored end preferably closing the ends of the slots for strength.

The short axle-section has a shoulder 7 at the wheel-hub, against which the shouldered socket end of the long shaft-section may abut. The short shaft-section has a diameter-hole 8 to receive a bolt 9, having an angular head 10, adapted to engage the slot in the socketed shaft end, while an angular block 11 engages the other slot and, being fitted therein on the bolt, is secured therein and within the slot by a nut 12, a cotter-pin 13, passing through an eye 14 in the bolt, serving as a lock for the nut. The slot-engaging angular parts of the bolt serve to limit the extent of the sliding of the short axle-section within the axle-socket by reason of the slots being longer than the head and block parts, as seen in Fig. 2. These slot-engaging bolt parts while with the bolt serve to lock the shaft-sections, so that they turn together. The bolt-head and block, which engage the slots, relieve the bolt of undue strain in effecting the rotation of the shaft parts together.

The brake-shoe 15, which engages the slidable wheel, is fitted on the brake-bar 16 so that it is free to slide with the endwise movement of the short shaft-section. For this purpose the sliding function of the shoe may be permitted by any suitable means of fastening it to the brake-bar. In the drawings, Figs. 5 and 6, I have shown the shoe as having a dovetail groove 17 and lip 18 and the brake-bar as being seated within said shoe-groove, while in Fig. 1 the brake-shoe and the wheel are shown in their normal relation when the car is running on a straight track, their relation being changed as indicated in Fig. 2, which would occur when a car is running around a curve in the track, and the wheel thereby causing its short section of the shaft to slide within its telescoping shaft-socket. The shoe-lip 19 acts on the outer side of the wheel and coöperates with the groove 17 to hold the shoe to the wheel.

Any suitable provision may be made for oiling the short axle, and at 19, Fig. 4, I have shown an aperture for this purpose.

I claim—

1. A car-axle of two sections one of which has a socket end and slots diametrically in the walls of said socket, the other section within the socket and formed with a diameter-hole, in combination with a bolt engaging the hole of the short shaft-section, having an angular head engaging one of the shaft-slots, a block engaging the other end of the bolt and the shaft-slot thereat, means for locking the block and the bolt in such engagement and a spring in the socket against the shaft therein.

2. A car-axle in two sections one having a socket, and diameter-slots in the walls thereof, the other shaft-section within said socket, means whereby the two shaft-sections are locked together within the said slots, and a spring in the socket against the shaft therein.

3. A car-axle of two sections one of which is adapted for longitudinal movement within the other, a spring controlling such movement in one direction, diameter-slots in the outer shaft section and means within said slots for connecting the two shaft-sections rotatively together and for limiting the longitudinal movement of one within the other.

4. A car-axle of two sections one of which is adapted for longitudinal movement within the other and each having a wheel fixed thereon, a spring controlling such movement in one direction, and a brake-shoe device, whereby one of the shoes has a fixed connection on the wheel and a slidable connection on the brake-bar to allow the shoe to have a free movement on the bar with the wheel in the way described.

In testimony whereof I affix my signature in presence of two witnesses.

CHARLES L. FAHNESTOCK.

Witnesses:
C. EDWIN CARL,
WM. L. SCHLEIGH, Jr.